United States Patent [19]

Jensen

[11] 4,160,995

[45] Jul. 10, 1979

[54] BIAS SETTING APPARATUS FOR USE WITH TELEVISION RECEIVERS

[76] Inventor: Erik A. Jensen, Baunehoj 22, 7600 Struer, Denmark

[21] Appl. No.: 762,368

[22] Filed: Jan. 25, 1977

[51] Int. Cl.² .................... H04N 9/20; H04N 9/535
[52] U.S. Cl. ............................................. 358/29; 358/65
[58] Field of Search .................. 358/29, 34, 64, 65, 358/242, 243

[56] References Cited

U.S. PATENT DOCUMENTS

| | | |
|---|---|---|
| 3,558,817 | 6/1967 | Van de Voort et al. ............ 358/242 |
| 4,012,775 | 3/1977 | Smith .................................... 358/29 |
| 4,014,038 | 3/1977 | Hwang et al. ........................ 358/29 |

OTHER PUBLICATIONS

Janssen et al., "Automatic Stabilization of Background Color in Color TV Receivers", IEEE Trans. on Consumer Electronics, Feb., 1977, pp. 8–13.

Primary Examiner—John C. Martin
Attorney, Agent, or Firm—Hume, Clement, Brinks, Willian & Olds, Ltd.

[57] ABSTRACT

A color television receiver having a circuitry for automatically adjusting the cut-off points of the electron guns, i.e. for adjusting the bias of each electron gun to make the guns responsive to video signals in a constant manner, wherein the bias and the video signal are both applied to the cathode of each gun through a switch. In permanent connection with the cathode is mounted an integrator operable to adopt and substantially maintain the bias voltage upon said switch being switched off, and in series with the integrator is arranged a current amplifier for detecting the cathode current in said series connection upon the other end thereof being connected to ground simultaneously with the switching off of said switch. The output of the current amplifier is fed through a further switch to the input terminal of a variable bias source so as to cause the same to maintain its output voltage if the current amplifier output has a value corresponding to a cathode current of a predetermined low intensity, but cause the bias voltage to increase or decrease if the amplifier output increases or decreases from said value, whereby the bias in the following period of display operation will be adjusted to stabilize the cut-off point of the electron gun. In a preparation phase defined by the vertical flyback control pulse the input of the video amplifier is connected to a constant voltage source providing a constant reference bias voltage applied to the cathode superimposed by the adjusted bias voltage from said variable bias source such that the combined bias sensed by said integrator is a well defined function of the adjusted bias voltage and therewith is usable for in a following detecting and adjusting phase to control the variable bias voltage in the relevant manner.

10 Claims, 1 Drawing Figure

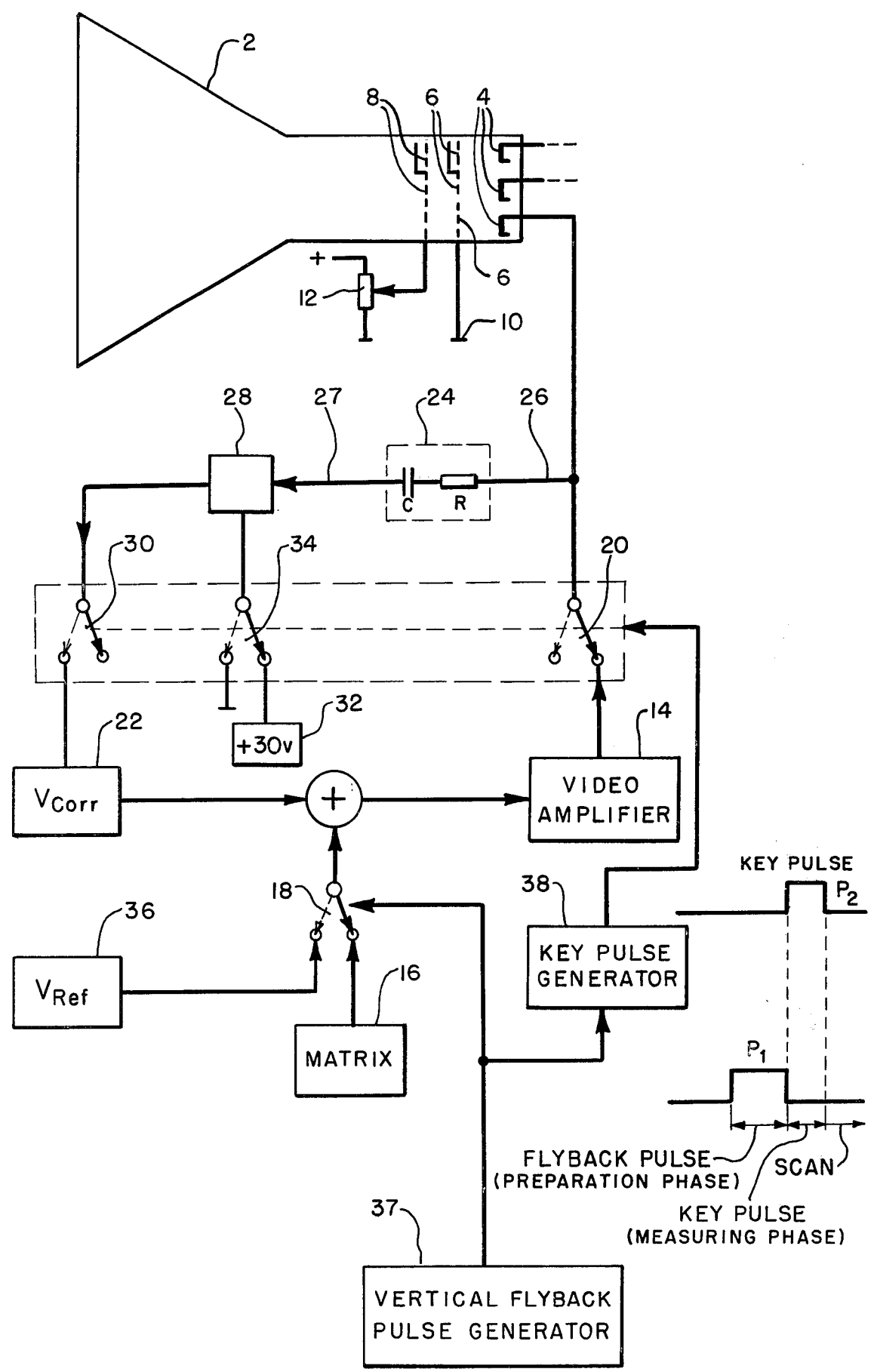

BIAS SETTING APPARATUS FOR USE WITH TELEVISION RECEIVERS

This invention relates to colour television receivers and more specifically to means for automatic adjustment or correction of the so-called cut off point of the electron guns in the display tube of the receiver. As specified in our British Patent Specification No. 1,432,254 to which reference is hereby made, the cut-off point of an electron gun is defined as the electrical state of the gun in which, by a certain bias voltage or cut-off voltage between the cathode and the control grid system of the gun, the cathode is just prevented from emitting an electron beam towards the screen of the display tube, while if the bias voltage difference is lowered from the cut-off voltage the electron gun will again be able to emit an electron beam and thus to produce light on the screen of the display tube. Thus the cut-off point represents the bias voltage at which the screen is turning black when the said bias voltage difference is increased and is turning light with increasing intensity when the bias voltage difference is increased, and especially in a colour television receiver it is important that the three electron guns included in the display tube are steadily having identical cut-off points in order to ensure that the intensity of the respective three colours on the screen are always adapted or proportioned in the correct manner to each other.

The natural or preadjusted cut-off point of each electron gun, however, may vary with the unavoidable variation of the electrical characteristics of the circuits or circuit components defining the cut-off points, and it has been a natural desire, therefore, to provide for means enabling the cut-off points to be adjusted automatically by repeatingly adjusting the bias voltages of the respective electron guns individually so as to ensure that all three guns cut off the respective electron beams at the same video signal voltage corresponding to "black". In practice this is achieved by detecting the cathode current of the guns at such moments or short periods of time at which the video signal is known to have a level corresponding to "black", viz. during the so-called line flyback periods, or — preferably — at which the video signal is disconnected from the guns and a constant reference bias voltage is applied to the guns, and causing a superimposed bias voltage to be adjusted in response to said current detection in such a manner that the current, if any, will decrease towards zero. The superimposed bias voltage thus adjusted is maintained by means of a time constant circuit until the next adjustment period so that in the meantime the guns will work with identical cut-off points as desired.

Accordingly this invention more specifically relates to a colour receiver of the type having a display tube incorporating a number of electron guns operable to produce electron beams to form a picture on the display screen of the tube and each comprising a cathode and a grid system and means for applying a bias voltage as well as a varying video signal voltage therebetween, and including means for defining timely spaced, consecutive measuring and adjustment periods during which the cathode current is detected while the video signal is suppressed, and the cathode current detection result is used for automatically adjusting a source of cut-off adjusted bias voltage so as to cause the bias to be adjusted to minimize the cathode current and thus maintain constant the so-called cut-off point of the respective electron gun. As known, each electron gun normally comprises, among other electrodes, a cathode, a control grid and a screen grid. The video signal is fed to either the cathode or the control grid, while the bias voltage or rather bias voltages are applied between the cathode at one side and the control grid and the screen grid, respectively, at the other side, and the said adjustable superimposed bias voltage may be applied between the cathode and either the control grid or the screen grid. In conventional display tubes the three electron guns and their electrodes are insulated from each other, and it is possible, therefore, to apply individually cut-off adjusted bias voltages to the individual control or screen grids. There is no principal problem in detecting the cathode current and simultaneously cause the bias voltage on the three individual control or screen grids to be adjusted as desired in direct response to the current detection, as the current may be used for changing the bias voltage until the current is minimized.

However, modern display tubes, so-called PIL tubes, have been developed, in which the three electron guns are materially built together so as to have their respective control grids and screen grids connected to each other, whereby it is not possible to effect individual bias voltage control on the grid electrodes. For cut-off point adjusting purposes it would be necessary to effect an adjustment of the voltage potential of the individual cathodes, to which also the video signals should be applied, and in practice the known automatic cut-off adjustment methods would not be applicable because the connection of either the video amplifier or a reference voltage to the cathode during the cathode current measuring or detecting period would imply either a permanent and undesired impedance between the video amplifier and the cathode or imply that the cathode current would run through the amplifier or the reference voltage source rather than through the current detector circuit.

It is the purpose of the invention to provide a colour television receiver of the type referred to in which the said automatic cut-off adjustment of the bias voltage may be effected by detecting the cathode current and adjusting the cathode voltage in accordance with said detection so as to maintain the desired cut-off point of the electron gun.

According to the invention there is provided a television receiver of said type, in which the video signals are applied to the cathodes of the respective electron guns and means for defining the said measuring and adjustment periods are designed so as to divide each of these periods into a preparation phase and a following measuring and adjustment phase, in which preparation phase the video signal on the respective cathode is suppressed, by being switched off or being "black" during the period, while the source of cut-off adjusted bias is maintained connected to the cathode, integrator means connected with the cathode being provided for sensing the cathode voltage at the end of said preparation phase and storing it during the following measuring phase, whereafter, during said measuring phase, the video amplifier is switched off from the cathode so as to leave the cathode biased by said sensed voltage and the cathode current is detected by detector means connected with said source of cut-off adjusted bias so as to cause this bias source to change its output voltage in response to a cathode current being detected, in such a manner that when thereafter the video amplifier is reconnected to the cathode for normal display operation of the display tube the adjusted bias will correspond to the desired cut-off point of the respective electron gun. In other words, while in the prior art the cut off bias voltage is adjusted in a direct manner so as to cause, during the measuring period, the cathode current to decrease towards zero, the invention provides for a preadjustment of the corrected bias voltage which is applied to the electron gun subsequent to and not simultaneously with the measuring period. It is hereby made possible to use one electrode, viz. the cathode, both for current detection, cut-off adjusted voltage biasing (relating to the grid system) and video signal reception (signal voltage again relative to grid system), and the invention, therefore, is well suited for use in connection with the said PIL (Precision-in-Line) tubes in which the grids of the three electron guns are interconnected while their cathodes are individual.

In the following the invention is described in more detail with reference, by way of example, to the accompanying drawing which is a schematic diagram of the relevant section of the display unit in a television receiver according to the invention.

The display unit shown comprises a display tube 2 of the PIL-type which is provided with three electron guns each comprising a cathode 4, a control grid 6 and a screen grid 8. The three control grids 6 are all grounded as shown at 10, and the screen grids 8 are interconnected and connected in common to a voltage divider 12 enabling the screen grid voltage to be adjusted as required; alternatively the screen grids may be separate and connected to individual voltage dividers. Each of the cathodes is connected to a circuit as follows.

For each colour there is provided a video amplifier 14 receiving its input from the respective signal detector or matrix 16 through a switch-over unit 18, the output of the amplifier being fed to the cathode 4 through a switch 20. To the input of the video amplifier is added a cut-off adjusted or corrected voltage from a voltage source 22, whereby the bias voltage on the cathode (i.e. between the control grid 6 and the cathode 4) is adjustable as desired, by means of the circuits described below.

An integrator unit 24 is connected directly to the cathode through a wire 26 in series through a wire 27 with a current amplifier 28 which is connected further to the correction voltage source 22 through a switch 30 which is switched off during the operation or scanning periods of the display tube and switched on only during a short interval of time preceding each new picture produced by the electron beams, as directed in more detail below.

The measuring amplifier 28 (or the wire 27) is connected with a constant positive voltage source 32, e.g. of +30V, through a switch-over switch 34 which is operable to shift this connection to the ground, so as to cause the cathode voltage to be reduced correspondingly when the cathode through switch 20 is disconnected from the video amplifier.

The integrator unit 24 includes a capacitor C and a high impedance resistor R, the latter serving to ensure that the video signal in normal operation is applied to the cathode without disappearing through the integrator unit. The capacitor C will sense the cathode voltage and be charged and decharged, with a certain time constant, according to the variations of the cathode voltage. At the end of each picture produced by the electron beams, therefore, the capacitor C is in a charging state depending of the character or strength of the video signal during the last interval of the picture or frame scanning period.

The operation of described voltage correction system is controlled by the conventional vertical flyback control pluse generator 37 of the receiver. The control pulse $P_1$ from this generator is used additionally for operating the switch 18 and for actuating a key pluse generating unit 38 such that this unit produces a key pulse $P_2$ in response to termination of the vertical flyback control pulse $P_1$, said key pulse being used for simultaneous actuation of the electronic switches 20, 30, 34. Thus, as shown in the pulse diagram of the drawing, the flyback control pulse $P_1$ defines the preparation phase and the following key pulse $P_2$ defines the measuring and adjustment phase. The width of the key pulse corresponds to the electron beam running through the first few lines of the new picture, these lines normally being located outside the visible area of the display screen.

The switch-over unit 18 is operable to connect the input of the video amplifier to a constant reference voltage source 36, and trigger means constituted by the pulse generator 37 are provided for switching the unit 18 in this manner in response to the electron beam having finished a picture and now returning to start a new picture, i.e. during the vertical flyback period the flyback control pulse $P_1$ is used for holding the input of the video amplifier 14 connected to the reference voltage source 36, whereby the cathode voltage is determined by the constant voltage $V_{Ref}$ superimposed by the correction voltage $V_{corr.}$ from the source 22. During this phase the cathode voltage is high enough to ensure that no electron beam is produced so as to avoid return tracks on the screen.

The time constant of the integrator unit 24 is small compared to the vertical flyback period, so at the end of this period the capacitor C will have been charged in well defined accordance with the constant cathode voltage as given by $V_{Ref}+V_{corr.}$ At the end of the flyback period the termination of the flyback control pulse is used for producing, by means of the key circuit 38 as mentioned, a measuring control or key pulse $P_2$ of short duration, this pulse being fed to the electronic switches 20, 30 and 34 so as to switch over the same during a short interval of time, shorter than corresponding to the time constant of the integrator unit 24 and in practice short enough to correspond, upon said vertical flyback, to the production of the first few lines of the new picture, these lines normally being produced outside the visible area of the display screen. The key pulse $P_2$ brings the circuits into a measuring phase in which the video amplifier is switched off from the cathode (switch 20) while the current amplifier 28 is connected to the correction voltage source 22 (switch 30) and the wire 27 is disconnected from the constant voltage source 32 and is switched to ground (switch 34), this latter switching giving rise to a corresponding drop of the positive cathode voltage. This voltage drop serves to make sure that the positive cathode voltage during the measuring phase is low enough to be able to cause a cathode ray to be produced, at some low intensity, as otherwise there might be no cathode current to detect, i.e. no reference for the adjustment to be made.

Thus, during the measuring phase the cathode voltage is given by the voltage stored in the capacitor C during the preceding preparation phase, less the said voltage drop, and the resulting cathode current to ground through the amplifier 28 and switch 34 is detected by the amplifier which produces a proportional voltage or current output fed through the switch 30 as an input to the voltage source 22 which is adapted so as to adjust its voltage accordingly, preferably by means of a capacitor charged by the amplifier output current during the measuring phase.

At the end of the measuring phase, by termination of pulse $P_2$, the switches 20, 30 and 34 are reset into their positions shown, while the switch 18 was switched back already at the end of the preparation phase, by the termination of the flyback control pulse $P_1$. Now, therefore, when the next picture is produced on the display screen, the cathode bias voltage is determined by the reapplied constant voltage from source 32 and the output of the voltage source 22 as adjusted or corrected during the last measuring phase.

In normal steady operation the system will work in kind of equilibrium, i.e. the cathode bias voltage as given by $V_{corr.}$ is capable of, when stored in the capacitor C and reduced by the switching off of the constant voltage source 32, producing a cathode current of a well defined very low intensity, which, when measured or detected, will cause the voltage source 22 to regenerate the same bias voltage during the next operation cycle.

Should for some reason the cut-off point of a gun change, then the cathode current during the measuring phase will also change, typically increase beyond said very low intensity. By such increase the output of the measuring amplifier 28 to the control input terminal of the voltage source 22 will also increase and thus cause $V_{corr.}$ to increase and therewith cause the cathode bias voltage to increase so as to eliminate the detected change of the cut-off point, since an increased bias voltage will cause a reduction of the cathode current to be detected during the next measuring period. Therewith the system has adjusted itself into a new equilibrium in which the capacitor of the voltage source 22 has adopted a higher voltage level which is maintained by the measuring current having its desired low intensity, while it is further raised should the measuring current again show a tendency to increase. Of course, the adjustment may take place over several operation periods, but as these follow each other with high frequency corresponding to the picture frequency a possible change will very rapidly be counteracted. Of course, also a change in the other direction will be correspondingly counteracted.

The key pulse generator 38 as well as the constant voltage sources 32 and 36 may be the same for all three electron guns in the display tube, but the remainders of the circuit shown should be provided for each of the three guns.

Many modifications will be possible within the scope of the invention. Thus, while it is highly preferred to adjust or correct the cut-off points of the electron guns at the basis of a constant reference voltage (36) it would of course be possible to substitute this voltage by the black level voltage of the video signal as occurring during the line flyback and frame flyback periods, whereby the voltage source 36 and the switch 18 could be avoided. This, however, would cause problems with respect to manual control of the general light intensity on the screen.

It will be appreciated that with the use of the switch 34 it is possible to utilize the frame flyback period preparatory to the current measurement to be made, without introducing the disadvantage of working with a cathode current during the flyback period, which would cause a visible ray spot track on the screen. The very current detection may be carried out when the switch 34 has caused a cathode current to be produced, immediately at the beginning of the new picture, during the movement of the cathode ray along the first, invisible lines thereof, whereafter the video amplifier is switched on through the switch 20 so as to cause production of the picture as required.

What is claimed is:

1. In a color television receiver having a display tube with a plurality of electron guns and a source of video signals for providing the proper signals to be applied to each of the electron guns, the improvement comprising:

timing means for defining selectively repeatable cathode voltage correction periods, each of said correction periods having a preparation phase followed by measuring and adjustment phase;

means individual to each electron gun for producing a respective correction voltage level;

means for producing a reference voltage level;

cathode voltage control means individual to each electron gun for selectively applying a composite test signal based on the sum of said respective correcting voltage level and said reference voltage level to the respective cathode during said preparation phase, said cathode voltage control means including reference switching means for applying a composite video signal based on the sum of said correcting voltage level and the signal from the source of video signals to the respective cathode between the occurences of said preparation phase;

storage means individual to each electron gun and coupled to the respective cathode for sensing the voltage level of the respective cathode at the end of said preparation phase, during said preparation phase said cathode voltage control means is applying said composite test signal, and said storage means storing the sensed voltage subsequent to said preparation phase during said measuring and adjustment phase;

video switching means individual to each electron gun for disconnecting said cathode voltage control means from the respective cathode during said measuring and adjusting phase, thereby allowing the application of a biasing voltage to the respective cathode which is determined by the stored voltage sensed at the end of the immediately prior preparation phase; and current sensing means individual to each electron gun for sensing the current of the respective cathode during said measuring and adjusting phase and for adjusting the correction voltage level of said correction voltage producing means as a function of the sensed current, such that the adjusted correction voltage applied to the respective cathode during normal operation subsequent to said measuring and adjustment phase corresponds to the cutoff bias of the respective electron gun.

2. The color television receiver of claim 1, wherein said timing means includes:

means for generating vertical flyback pulses, wherein each flyback pulse defines said preparation phase; and means for generating a key pulse upon the termination of each vertical flyback pulse, wherein each key pulse defines said measuring and adjusting phase.

3. The color television receiver of claim 1, wherein said storage means includes a resistor, a capacitor, and a storage switch, said resistor and said capacitor being serially coupled between the respective cathode and said switch, said switch being responsive to said measuring and adjustment phase for connecting said serially coupled resistor and capacitor to a first voltage during said measuring and adjustment phase and for connecting said serially coupled resistor and capacitor to a second voltage between the occurrences of said measuring and adjustment phase, the second voltage acting as a gun bias during normal operation and during said preparation phase, and the first voltage being sufficiently lower than the second voltage to cause an electron beam to be produced during said measuring and adjusting phase.

4. The color television receiver of claim 3 wherein said first voltage is ground and said second voltage is a source of constant voltage.

5. The color television receiver of claim 4, wherein said timing means includes:
   means for generating vertical flyback pulses, wherein each flyback pulse defines said preparation phase; and
   means for generating a key pulse upon the termination of each vertical flyback pulse, wherein each key pulse defines said measuring and adjusting phase.

6. In a color television receiver having a display tube incorporating a number of electron guns each comprising a cathode and a grid system, video amplifier means for supplying video signals to the cathodes of the respective electron guns, bias producing means connected between the cathode and the grid system of each electron gun to provide proper operational bias therebetween, said bias producing means comprising:
   a source of adjustable correction voltage for each electron gun;
   timing means for defining repeatable bias correction periods, each of said correction periods having a preparation phase followed by a measuring and adjustment phase;
   means for producting a reference voltage level;
   reference switching means operable to apply to a respective cathode during said preparation phase a composite test signal based on the sum of said reference voltage level and said correction voltage level;
   storage means operable to sense the voltage level of the respective cathode at the end of said preparation phase and to store the sensed voltage during the following measuring and adjustment phase;
   video switching means operable to disconnect said video amplifier means from the respective cathode during said measuring and adjusting phase; and
   current sensing means operable to sense the current of the respective cathode during said measuring and adjusting phase and to effect adjustment of said correction voltage level as a function of the sensed current, such that the adjusted correction voltage applied to the respective cathode during subsequent normal operation defines a bias level corresponding to the cutoff bias of the respective electron gun.

7. The color television receiver of claim 6, wherein said timing means includes:
   means for generating vertical flyback pulses, wherein each flyback pulse defines said preparation phase; and
   means for generating a key pulse upon the termination of each vertical flyback pulse, wherein each key pulse defines said measuring and adjusting phase.

8. The color television receiver of claim 6, wherein said storage means includes a resistor, a capacitor, and a storage switch, said resistor and said capacitor being serially coupled between the respective cathode and said switch, said switch being responsive to said measuring and adjustment phase for connecting said serially coupled resistor and capacitor to a first voltage during said measuring and adjustment phase and for connecting said serially coupled resistor and capacitor to a second voltage between the occurrences of said measuring and adjustment phase, the second voltage acting as a gun bias during normal operation and during said preparation phase, and the first voltage being sufficiently lower than the second voltage to cause an electron beam to be produced during said measuring and adjusting phase.

9. The color television receiver of claim 8 wherein said first voltage is ground and said second voltage is a source of constant voltage.

10. The color television receiver of claim 9, wherein said timing means includes:
    means for generating vertical flyback pulses, wherein each flyback pulse defines said preparation phase; and
    means for generating a key pulse upon the termination of each vertical flyback pulse, wherein each key pulse defines said measuring and adjusting phase.

* * * * *

UNITED STATES PATENT AND TRADEMARK OFFICE
CERTIFICATE OF CORRECTION

PATENT NO. : 4,160,995  
DATED : July 10, 1979  
INVENTOR(S) : Erik Albert Jensen It is certified that error appears in the above-identified patent and that said Letters Patent are hereby corrected as shown below:

On the title page of the Patent following "Filed: Jan. 25, 1977", and on the first page, as the first sentence of the specification following the title, add the following:

--Priority is claimed, based on Great Britain Application 3052/76, filed on January 27, 1976.--

Signed and Sealed this

Fourth Day of December 1979

[SEAL]

Attest:

SIDNEY A. DIAMOND

Attesting Officer     Commissioner of Patents and Trademarks